Oct. 27, 1931.  R. E. SWARTOUT  1,829,023
AUTOMOBILE STORAGE APPARATUS
Filed June 30, 1930   6 Sheets-Sheet 1
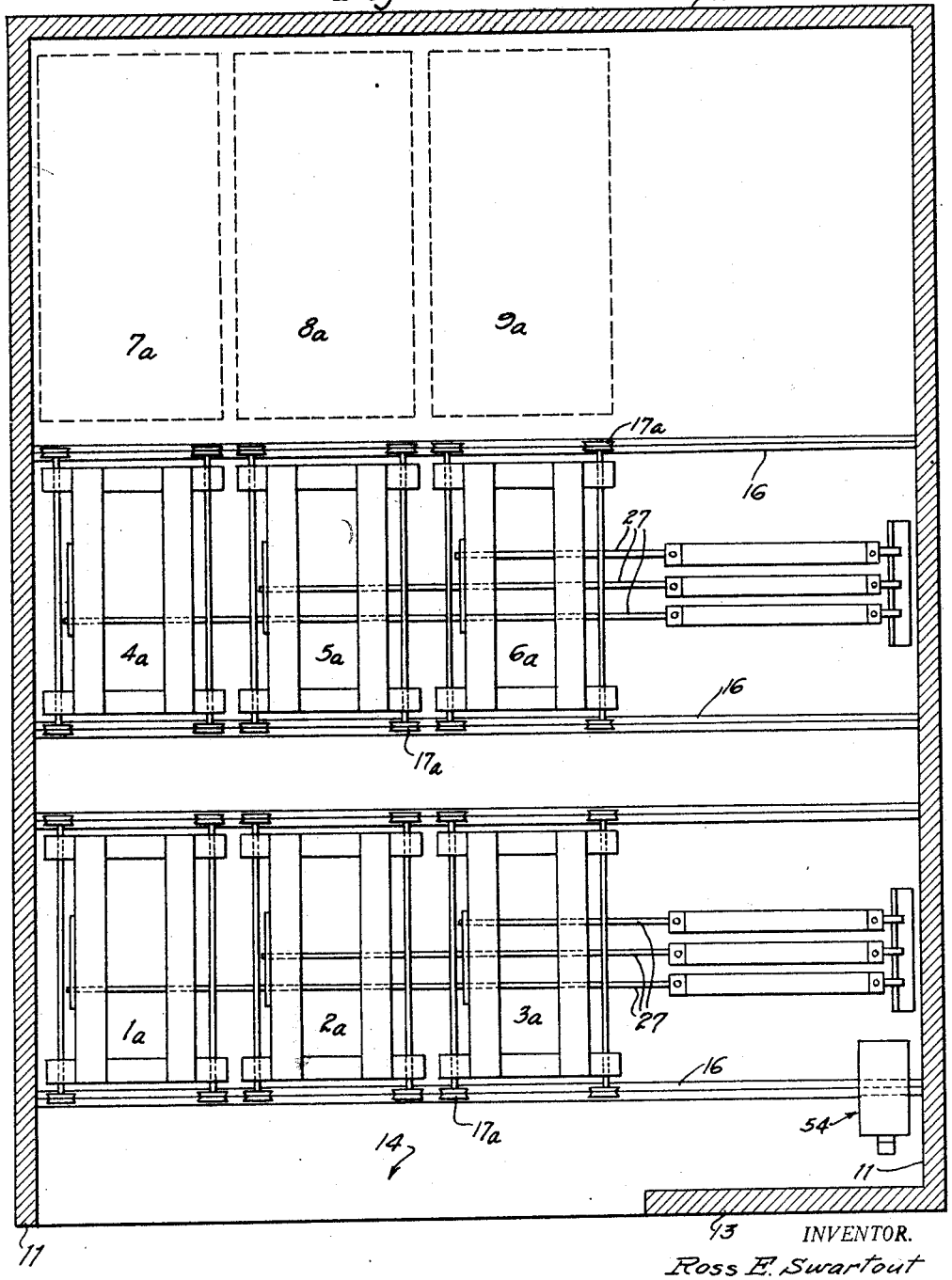
INVENTOR.
Ross E. Swartout
BY Robt. D. Pearson
ATTORNEYS.

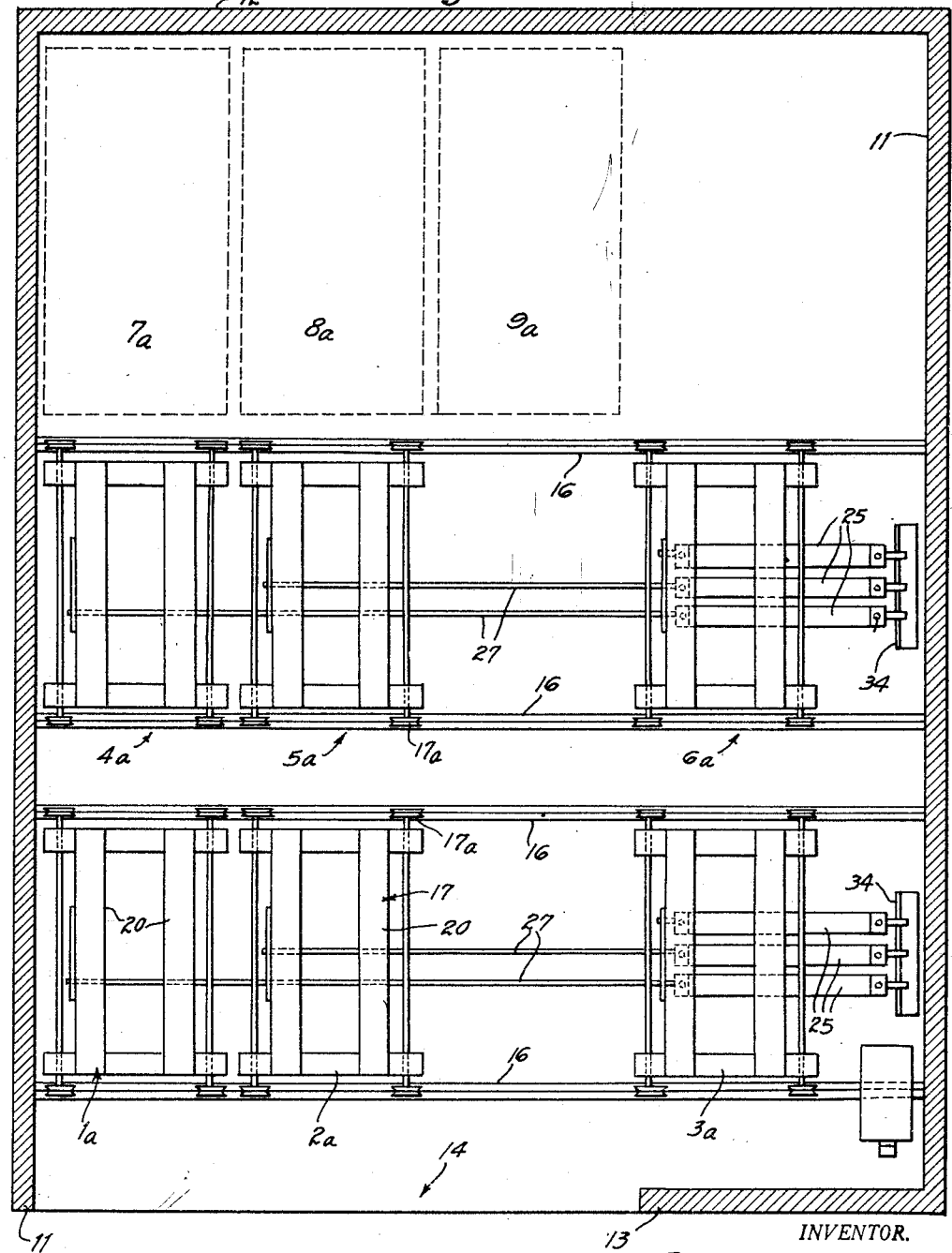

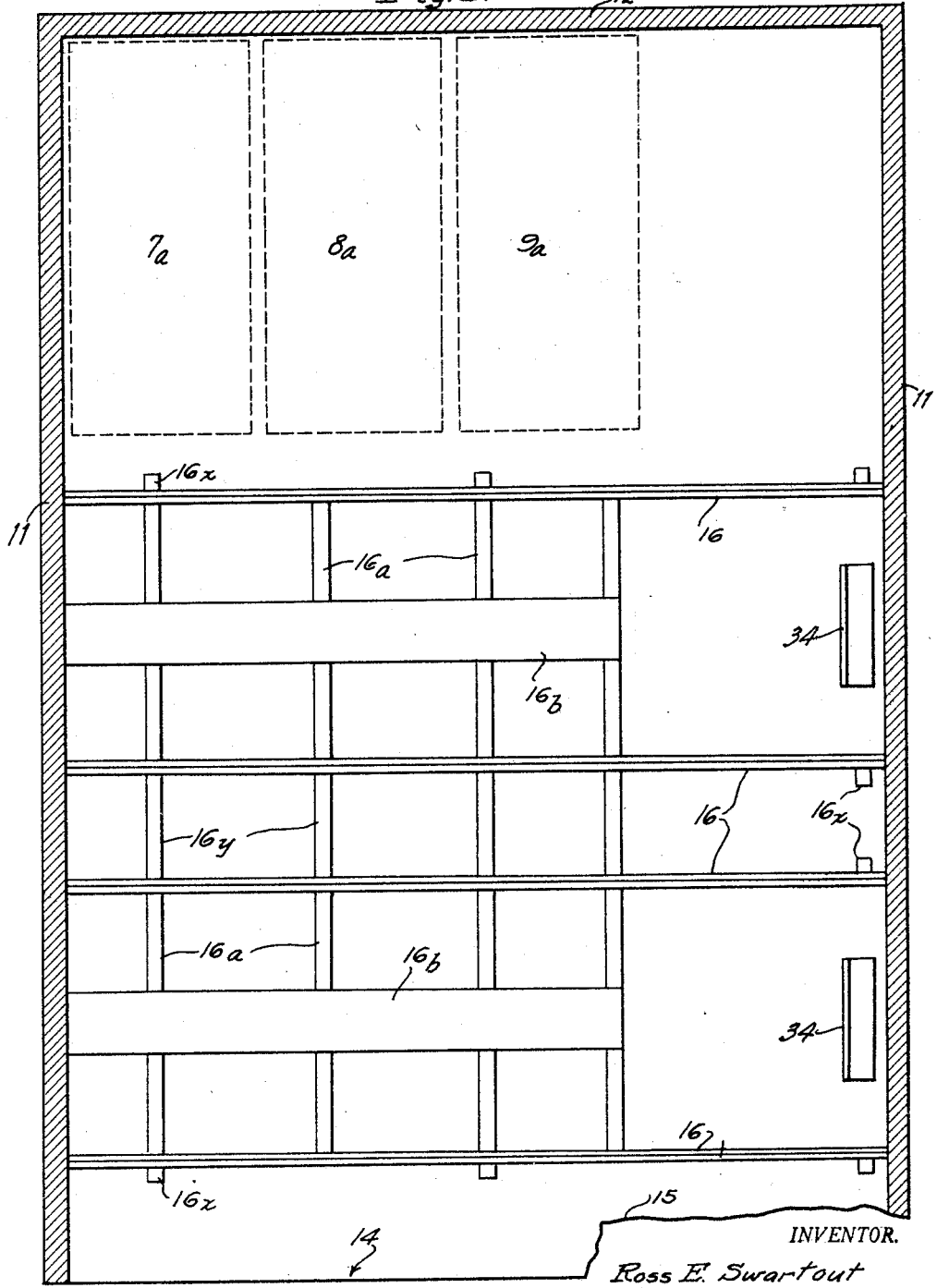

Oct. 27, 1931.  R. E. SWARTOUT  1,829,023
AUTOMOBILE STORAGE APPARATUS
Filed June 30, 1930  6 Sheets-Sheet 4
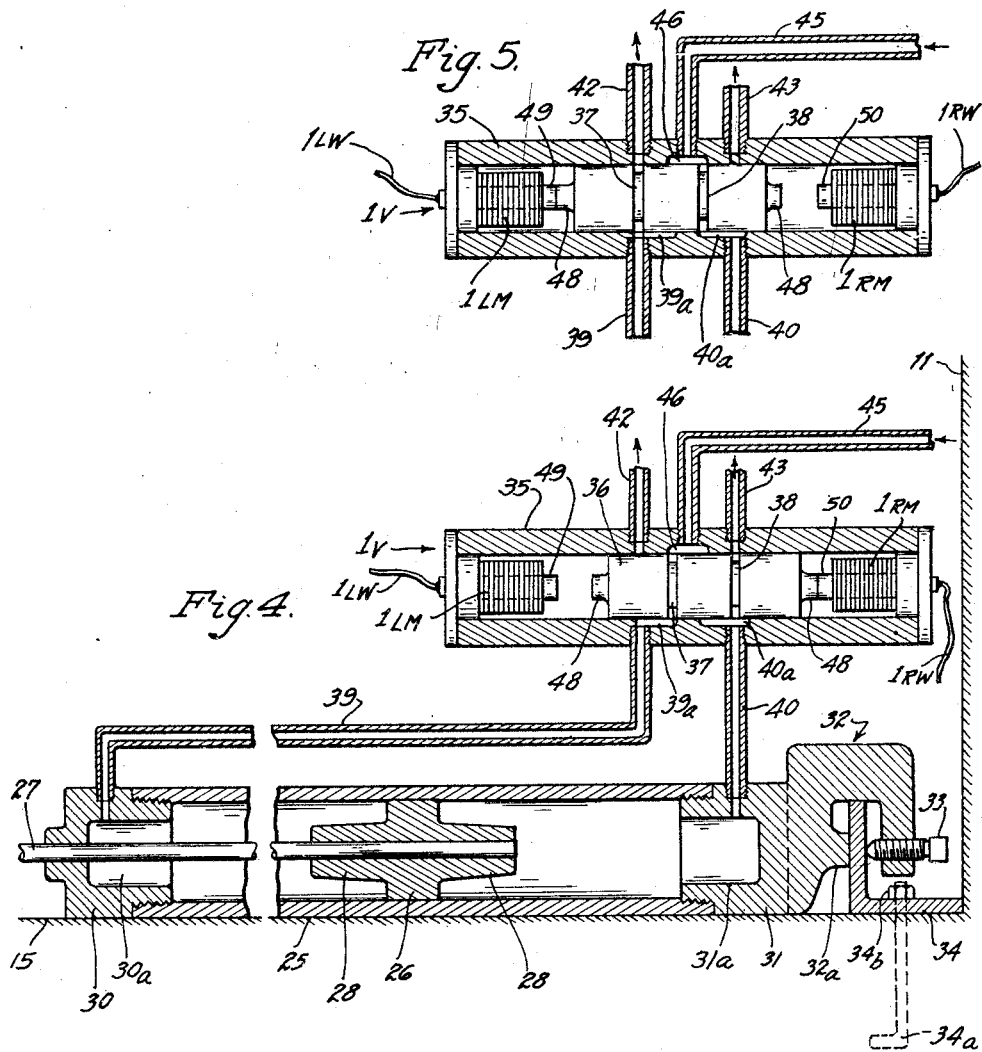
INVENTOR.
Ross E. Swartout
BY Robt. D. Pearson
ATTORNEYS.

Oct. 27, 1931.  R. E. SWARTOUT  1,829,023
AUTOMOBILE STORAGE APPARATUS
Filed June 30, 1930   6 Sheets-Sheet 5
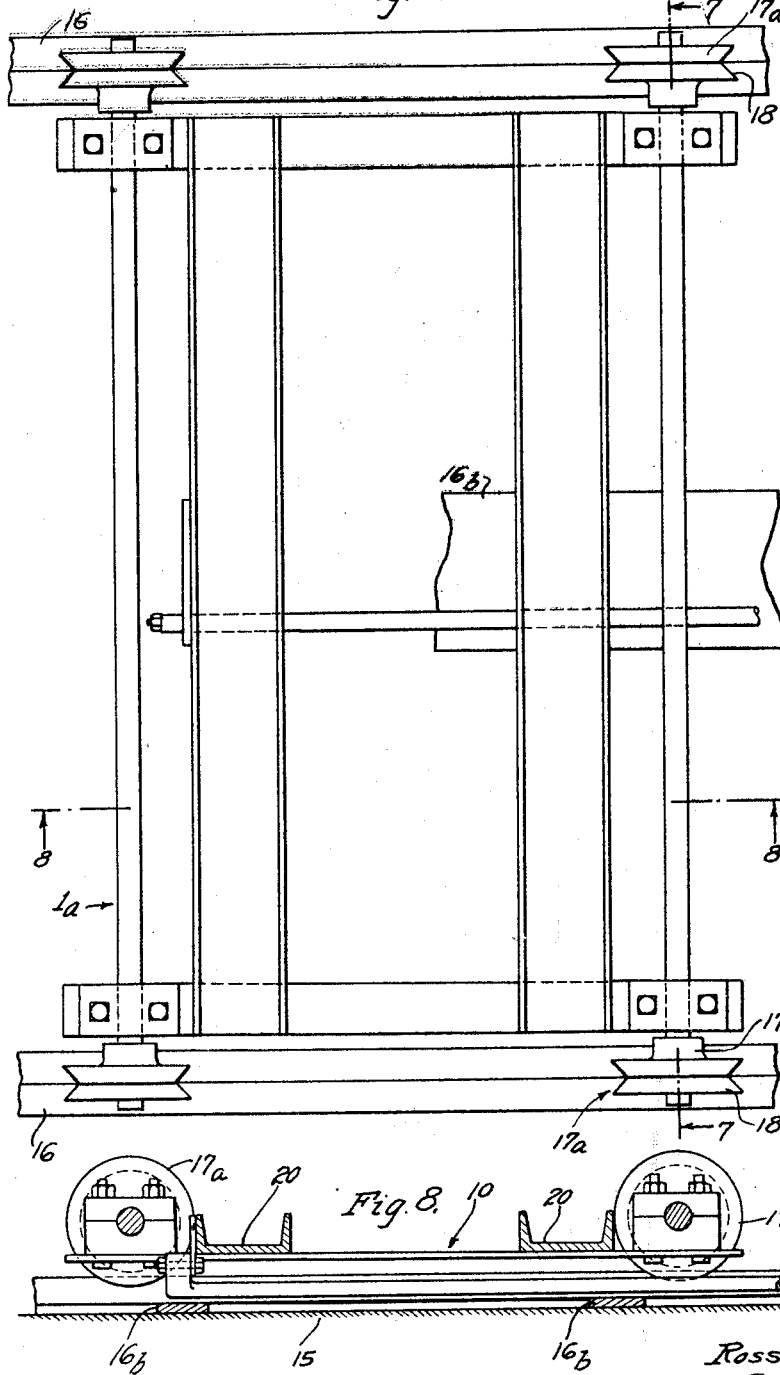
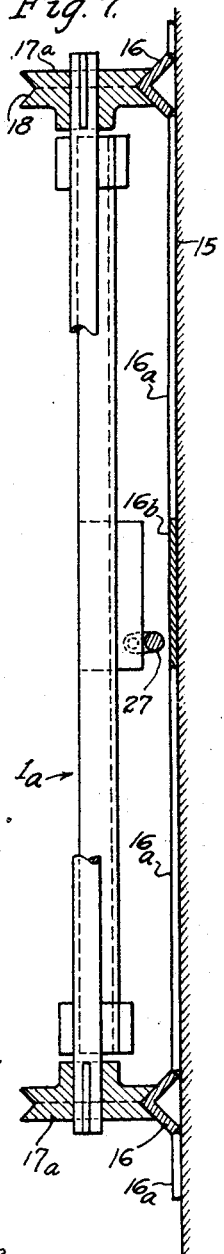
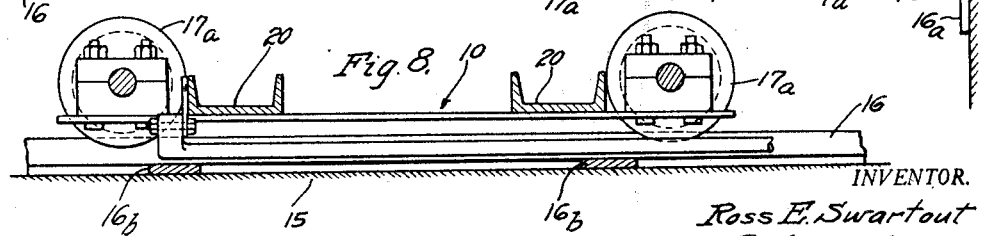
INVENTOR.
Ross E. Swartout
BY Robt. W. Pearson
ATTORNEYS.

Oct. 27, 1931.    R. E. SWARTOUT    1,829,023
AUTOMOBILE STORAGE APPARATUS
Filed June 30, 1930    6 Sheets-Sheet 6
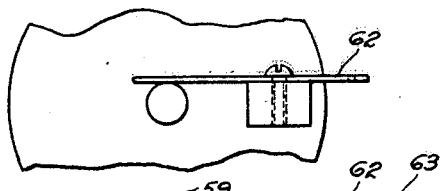
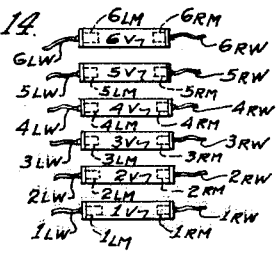
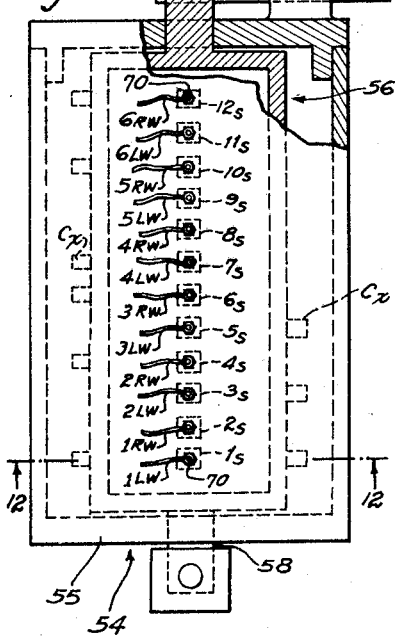
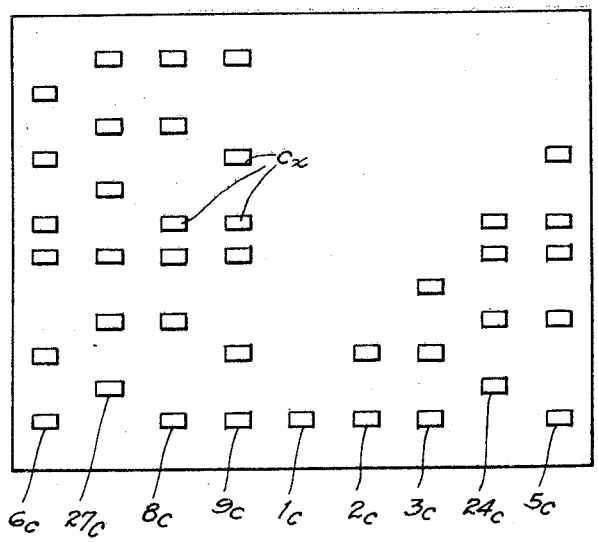
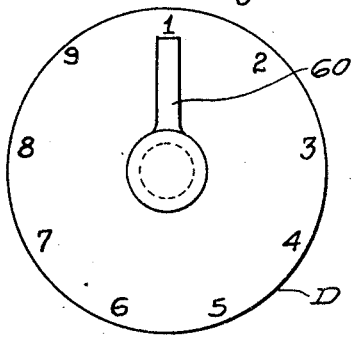
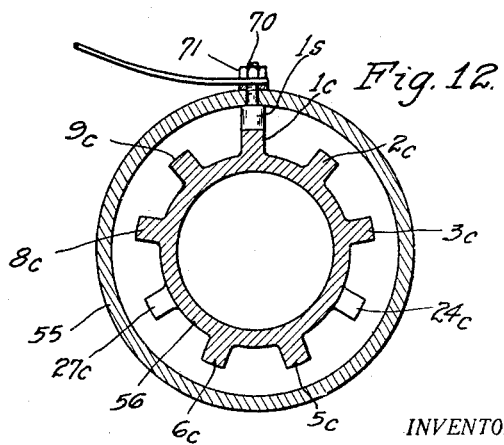
INVENTOR.
Ross E. Swartout
BY Robt. W. Pearson
ATTORNEYS.

Patented Oct. 27, 1931

1,829,023

UNITED STATES PATENT OFFICE

ROSS E. SWARTOUT, OF LOS ANGELES, CALIFORNIA

AUTOMOBILE STORAGE APPARATUS

Application filed June 30, 1930. Serial No. 464,994.

My invention relates to automobile storage apparatus by which the stored automobiles are parked on movable trucks, and the improvements consist in the arrangement of, and in the means for moving the said trucks.

The objects of this invention are, first, to provide improved means for making it possible to store a large number of automobiles in a given space and at the same time permitting entrance and removal of any automobile to or from any storage space without removing any of the other stored automobiles.

The principle of this invention is explained as follows. The automobiles are stored side by side in parallel rows, and every automobile, with the exception of those in the last row, is driven on a low, movable four wheel truck. Means are provided to move any predetermined number of the said trucks sidewise, at a right angle to the length axis of the automobiles, so as to create a passage for an automobile between the entrance and any automobile storage space in the storage room.

Other objects, advantages and features of invention may hereinafter appear.

Referring to the accompanying drawings which illustrate what is at present deemed to be a preferred embodiment of the invention, Fig. 1 is a plan view of the apparatus showing only three automobiles stored therein, the positions of which are indicated by broken lines.

Fig. 2 is a plan view of the apparatus showing the position thereof, the full storage capacity being assumed to be utilized and the auto-carrying trucks being arranged to permit the exit of an automobile in the rear row. In this view, in order to simplify the drawing, the automobiles assumed to be upon the trucks are omitted, and the automobiles of the rear row are outlined by broken lines.

Fig. 3 is a plan view of the same character as that shown in Fig. 1 except that the trucks are omitted in order to show underlying construction.

Fig. 4 is a sectional view of one of the devices which is operated by fluid pressure to move the auto-carrying trucks as required to permit the exit of an automobile in one of the rear rows.

Fig. 5 is a sectional view of the control valve shown in Fig. 4, the position thereof being different from that shown in the latter view.

Fig. 6 is a plan view of one of the auto-carrying trucks or transports, showing fragments of the track therefor.

Fig. 7 is a side elevation of Fig. 6.

Fig. 8 is an end elevation of Fig. 6.

Fig. 9 is a plan view of the controller, parts of the casing being broken away to show interior construction.

Fig. 10 is an end view of the controller.

Fig. 11 is a view of the end of the controller opposite to that shown in Fig. 10, parts thereof being broken away.

Fig. 12 is a cross section of the controller on line 12—12 of Fig. 9.

Fig. 13 is a developed view of the controller contacts.

Fig. 14 is a diagrammatic view of the set of devices (one of which is shown in Fig. 5) which is operated by fluid pressure under the direction of electrically moved control valves. In this view the terminal portions of the wires of each of the magnets which operate said valves are shown and lettered for convenient association with the wired terminals of the controller as shown in Fig. 9.

Referring in detail to the drawings, the apparatus may be installed either in the open air or within a suitable building or enclosure, but as illustrated a storage room is provided having side walls 11, a rear end wall 12, a front wall 13 and a door opening 14. Transversely across the floor 15 of this room extend two parallel tracks consisting of the pairs of rails 16, the preferred form of rail being angular, as well shown in Fig. 7.

The angular rails 16 are shown resting directly upon a cement or other hard floor 15, but these rails are held properly spaced by means of the inside spacing ties 16a and the outside spacing ties or blocks 16x, 16y, in combination with intermediate spacing elements 16b. These spacing members 16a and 16b are by preference and as shown comparatively thin metal strips. The intermediate strip 16b is a longer, wider strip which separates the ties of each track into two groups and extends at a right angle with respect to these ties. The object of thus positioning the strip 16b is to prevent possible striking of any of the piston operated elements against the edges of the spacing ties 16a.

Along the tracks formed by each pair of rails 16, travel trucks having wheels 17 which are provided with angular grooves or tread portions 18 adapted to fit over the angular portions of said rails, said rails being positioned with their external angles up and their internal angles down.

In the drawings six of the trucks referred to are illustrated, three of them being mounted upon each of the recited tracks, said trucks being lettered from left to right beginning with the lower row as seen in Fig. 1, as 1a, 2a and 3a, the trucks upon the other tracks being likewise lettered 4a, 5a and 6a. Each of these trucks are of a low frame type and are provided with transversely extending channel iron frame pieces 20 adapted to receive and support the wheels of the self-propelled vehicles which may be driven thereonto.

In the drawings no vehicles are shown supported upon the trucks, but in Figs. 1 and 2 the positions of three vehicles in the rear row are, by broken lines, designated 7a, 8a and 9a. The means will now be described whereby the trucks, or vehicle transports 1a to 6a inclusive are reciprocated along the rails 16 as may be required to clear an exit space through which automobiles of the rear row may be driven and thence out door 14. For this purpose a set of fluid propelled, valve controlled, piston operated elements are provided, one of which is illustrated in detail in Fig. 4. Referring to the latter view, within the piston cylinder 25 reciprocates the piston head 26 which is connected to one end of and operates piston rod 27, the other end of piston rod 27 being made fast to the trucks 1a as shown in Figs. 1 and 2 in order that said piston and its rod may reciprocate said truck along the track upon which it travels.

The piston cylinder 25, as viewed in Fig. 4 is provided at its left end with a closure head 30 which screws into the body portion of the cylinder and which contains the recess 30a. Said recess is located axially of the piston cylinder 25 and is of less diameter than the internal diameter of said cylinder, but is of slightly greater diameter than the average diameter of the tapered piston head extension 28 which is designed to cooperate therewith in order to retard the movement of the piston head 26 as it approaches the limit of its travel toward said recess 30a.

At the other end of said piston cylinder a closure and mounting head 31 is provided, said head likewise screwing into the body portion of the piston cylinder 25, and being provided with a recess 31a which corresponds to the recess 30a opposite the other end of the piston cylinder and which performs a similar function. This head 31 is provided with a clamp portion 32 having a clamping screw 33 and a clamping abutment 32a. Said clamping device is adapted to grip the vertical arm of an angle iron support 34 which is secured to the floor by means of an anchor bolt 34a provided with a nut 34b.

In order to provide for movements of each of the pistons 26 in the direction and at the time desired, a control valve is provided for each of these pistons, one of these control valves designated 1v being shown in Figs. 4 and 5. Describing said control valve in detail, within the valve cylinder or casing 35 is mounted a cylindrical valve proper 36. This valve cylinder 36 has extending therearound the annular grooves 37 and 38, said groove 37 controlling the flow of fluid through pipe 39 which communicates with the left end of the piston cylinder 25 as seen in Fig. 4, and said groove 38 controlling the flow through pipe 40 which communicates with the right hand end of the piston cylinder 25.

In directing the flow of fluid through said pipes 39 and 40, said annular grooves 37 and 38 cooperate with grooves 39a and 40a formed in the wall of cylinder 35 adjacent to the respective pipes 39 and 40 shown in Fig. 4. The exhaust from the left end of piston cylinder 25 takes place through pipe 42 (see Fig. 5), and the exhaust from the right end of said piston takes place through pipe 43 (see Fig. 4). Pressure is supplied to valve casing 35 through the pipe 45, said valve casing having a short groove or recess 46 provided at the point where pipe 45 communicates therewith.

Each end of the valve proper 36 is provided with a boss or contact projection 48. One of these bosses cooperates with the armature 49 of the left hand magnet designated 1LM and the other of these bosses cooperates with the armature 50 of the magnet designated 1RM. (These designations respectively signify the first left hand magnet and the first right hand magnet, and conform with the lettering of the electrical diagram shown in Fig. 14.) In Fig. 4 the control valve is shown positioned to direct the fluid pressure into the left hand end of the piston cylinder 25, this adjustment of the control valve having taken place by reason of energizing of the magnet 1RM in the manner which will later be described. In Fig. 5 the control valve is shown positioned to direct the pressure into the opposite end of the piston cylinder 25, this adjustment of the control valve having taken place by reason of energizing of the left hand magnet 1LM.

Means will next be described for controlling the supply of electric current to the electromagnets of the various control valves in order to operate the pistons within the various piston cylinders for the purpose of shifting the individual trucks 1a, 2a etc., as may be necessary to provide exit space for a rear vehicle. Referring to Fig. 14, this view shows diagrammatically not only the control valve 1v together with its magnet 1LM and 1RM which are detailed in Figs. 4 and 5, but shows also the control valves and magnets which make up the remainder of the set whereby all the various trucks 1a, 2a etc., are moved along the track upon which they travel in both directions. The six wires of the left hand magnets are, from the lower side to the top of the view, progressively numbered 1LW, 2LW etc., up to 6LW, while those on the right hand side are likewise lettered 1RW, 2RW, etc., up to 6RW. A similar system of lettering is employed for the valves 1v, 2v, etc.; and for the electromagnets 1LM, 2LM, etc., and 1RM, 2RM, etc.

Referring now to Fig. 9, the other ends of these wires connect up with the controlling device 54 there shown and in said view are correspondingly lettered. The controlling device just mentioned comprises a preferably cylindrical casing 55 wherein is mounted the current adjustor or distributor 56. Said adjustor being a cylinder which is fixed to or formed in one piece with a front trunnion 58 and a rear trunnion 59. The front trunnion 58 has fixed thereto a combined operating handle and pointer 60 which cooperates with a dial D and which may be directed towards any one of the numbers 1 to 9 inclusive that are inscribed upon that end of the cylinder 55. The current distributor 56 together with its trunnion 59 is formed of conducting material and current is continuously supplied thereto through the trunnion 59 by means of the buss bar 62 from the line wire 63.

The distributor 56 is provided with a radially extending external series of contact bosses which individually cooperate with stationary contacts carried by the cylinder 55. Such of these contact bosses as are seen in section in Fig. 12 are progressively lettered beginning at the top and proceeding in a clockwise direction, 1c, 2c, 3c, 5c, 6c, 8c, and 9c. The same lettering is therefore applied to the lower row of contacts shown developed in Fig. 13. The two contacts forming the next row appear unsectioned in Fig. 12 and are there lettered 24c and 27c, being also lettered thus in the developed view.

Each of the remaining movable contacts shown in development in Fig. 13 above the two lower rows thereof are designated cx, as it will not be necessary to refer to all these contacts individually in order to understand the operation hereinafter described.

A row of stationary contacts are mounted within the casing 55 of the control 54, these contacts being, in Fig. 9, progressively lettered from below upwards as 1s, 2s etc., up to 12s. These contacts are each provided with a contact post 70 and nut 71.

*Operation.*—When, for example, the automobile designated 9a in Fig. 1 is to be removed, the procedure is as follows: To make this possible, only two manual operations are required, namely, first, the control lever is turned to the number 9 on the face of the controller, and second an electric switch not shown in the present drawings, is turned on, connecting up to a source of electric current. The electric current thus supplied enters through the buss bar 62 of Fig. 9 passing thence through the trunnion 59 into the body portion of the rotary distributor 56. From said distributor it passes through six of the contact lugs of the distributor 56 and also through six of the terminals 70 and their wires shown in Fig. 9. The contact thus made is such as to move the trucks 1a, 2a, 4a and 5a to the left and the trucks 3a and 6a to the right, which position is illustrated in Fig. 2 where a passage is shown provided to allow the automobile 9a to be driven out of the storage room.

This movement of the proper auto-carrying trucks in the directions stated, results from the fact that when the arm 60 is directed toward the number 9 on the face of the dial D shown in Fig. 10, the lower row of contacts shown in development in Fig. 13 are individually brought into contact with the proper six stationary contacts of Fig. 9, that is to say with the stationary contacts 1s, 3s, 6s, 7s, 9s and 12s. These stationary contacts are respectively provided with the wires 1LW, 2LW, 3RW, 4LW, 5LW and 6RW. By locating the other ends of these wires on Fig. 14 where they are lettered in the same manner, it will be seen that current will thus be supplied to the proper electromagnets upon the functioning of which the proper control valves will be moved in the proper directions to cause the pistons 26 thus selectively actuated to bring the trucks into the position shown in Fig. 2, which position, as already stated provides an exit passage for the vehicle 9a.

From the foregoing example of the operation of the device, it will readily be understood how any desired arrangement of the trucks may be obtained as required, for the removal of an automobile whether such automobile be located on the floor in the rear row or upon one of the trucks in a position where it could not otherwise be driven out through the door 14.

What is claimed is:—

1. In an apparatus of the kind described, a track, a plurality of trucks mounted upon and adapted to travel along said track, said trucks being adapted to have self-propelled vehicles driven on to and off from them, each of said trucks having a piston rod connected thereto, a separate piston for each of said rods, a piston cylinder for each of said pistons, a fluid pressure supply to operate said pistons, and a manually controllable means adapted to selectively direct fluid to one or more of said pistons as desired for the purpose of moving said trucks to provide a clearance in the row of trucks at the point desired.

2. In an apparatus of the kind described, a track, a plurality of trucks mounted upon and adapted to travel along said track, said trucks being adapted to have self-propelled vehicles driven on to and off from them, each of said trucks having a rod connected thereto, a separate piston for each of said rods, a piston cylinder for each of said pistons, a fluid pressure supply to operate said pistons, a control valve for each of said piston cylinders to cause the piston therein to move in either direction as desired, electromagnets to operate said control valves, and a manually controllable electric distributor adapted to selectively operate said electromagnets for the purpose of moving said trucks to provide a clearance in the row of trucks at the point desired.

3. In an apparatus of the kind described, a support having a plurality of tracks supported thereby; a plurality of trucks mounted upon and adapted to travel along each of said tracks, said trucks being adapted to have self-propelled vehicles driven on to and off from them, each of said trucks having a piston rod connected thereto; a separate piston for each of said rods; a piston cylinder for each of said pistons; a fluid pressure supply to operate said pistons; a control valve for each of said piston cylinders to cause the piston therein to move in either direction as desired; electromagnets to operate said control valves; and a manually controllable electric distributor adapted to selectively operate said electromagnets, said electric distributor comprising a series of stationary contacts one for and connected with each of said electromagnets, and a series of movable contacts all supplied from a common source of electric current and collectively movable to bring predetermined groups of them into an operative relation with said set of stationary contacts for the purpose of energizing the proper electromagnets thereby to selectively operate said electromagnets in order to move the proper trucks and thus provide a clearance in one or more front rows of trucks at the point necessary to afford a road-way through which a rear vehicle may be driven.

4. In an apparatus of the kind described, a support having a track supported thereby, a plurality of trucks mounted upon and adapted to travel along said track, said trucks being adapted to have self-propelled vehicles driven on to and off from them, each of said trucks having operating means connected therewith, means to actuate said operating means to move said truck in either direction along said track as desired, an electric device to put into operation each of said actuating means, and a manually controllable electric distributor adapted to selectively operate said electric devices, said electric distributor comprising a series of stationary contacts one for and connected with each of said electric devices, and a series of movable contacts all supplied from a common source of electric current and collectively movable to bring predetermined groups of them into an operative relation with said set of stationary contacts for the purpose of energizing the proper units of said electric devices thereby to selectively operate said electric devices in order to move the proper trucks and thus provide clearance in said row of trucks at the point necessary to afford a roadway through which a rear vehicle may be driven.

In testimony whereof I hereunto affix my signature.

ROSS E. SWARTOUT.